March 7, 1933.   R. W. SWANK   1,900,206
COUPLING
Filed Oct. 18, 1930
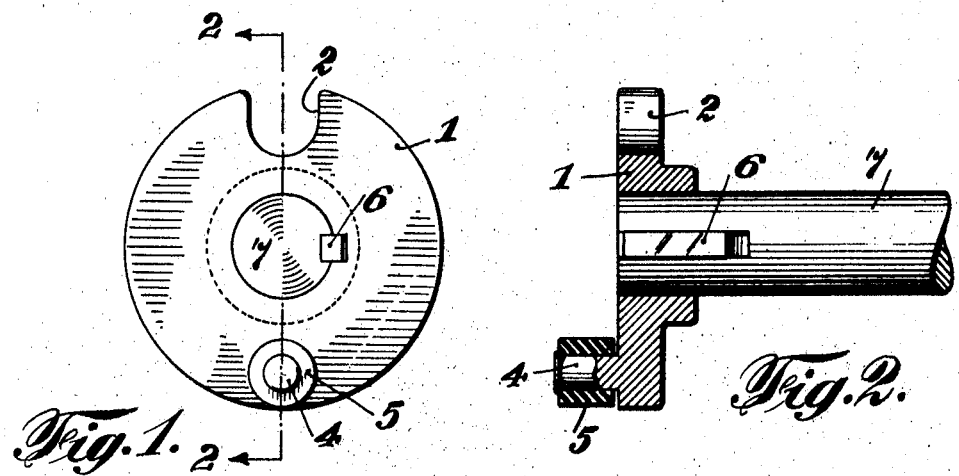
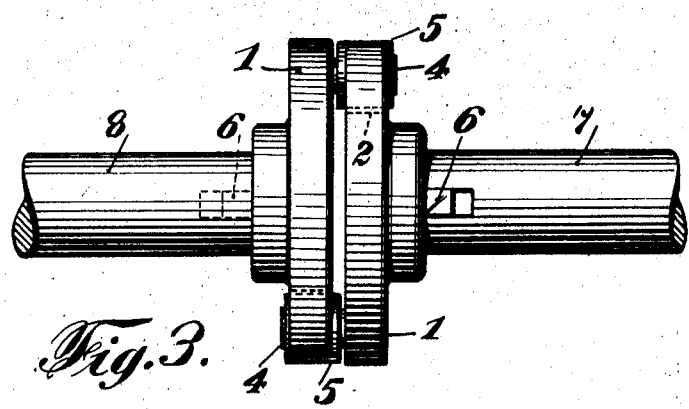
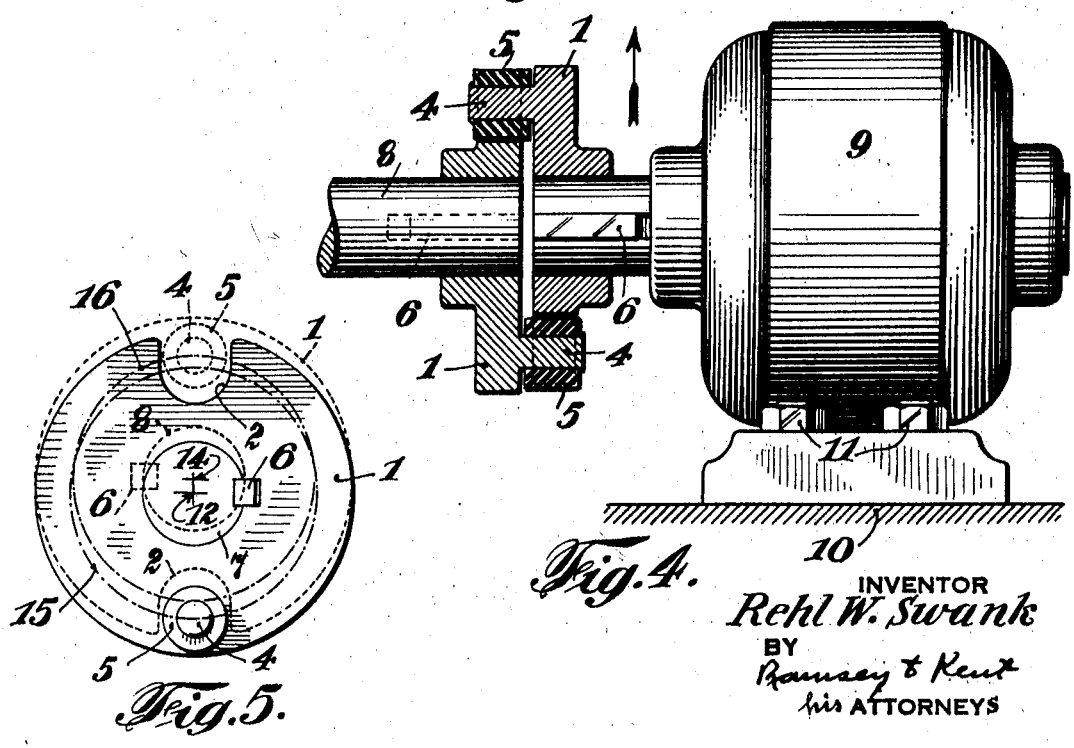
INVENTOR
Rehl W. Swank
BY
Ramsey & Kent
his ATTORNEYS Patented Mar. 7, 1933

1,900,208

UNITED STATES PATENT OFFICE

REHL W. SWANK, OF SHARPSVILLE, PENNSYLVANIA, ASSIGNOR TO SHARPSVILLE BOILER WORKS CO., OF SHARPSVILLE, PENNSYLVANIA, A CORPORATION OF PENNSYLVANIA

COUPLING

Application filed October 18, 1930. Serial No. 489,603.

The present invention relates broadly to machine elements and more specifically to a simple form of coupling.

The present invention comprises a very simple connecting member between revolving parts, which member is constructed to transmit rotary motion without transmitting axial vibrations from one member to the other. This coupling is so constructed as to permit transmission of rotary motion from a driving shaft to a driven shaft even where the shafts are slightly out of alignment either as to angular relation or as to lateral displacement, and the construction is such as to facilitate disconnecting the coupling elements without removal of bolts, screws or other fasteners. It is particularly adapted for small units which are close coupled such as a motor and a small pump whereby either the motor or the pump may be easily and quickly removed by merely unfastening the same from its supporting base and lifting it out of place.

Another feature of the present invention is that of simplicity, in that the engaging members of the coupling are identical so that the manufacture of a single part permits the assembly of two of these parts to complete the coupling.

Other and further objects of the present invention will in part be obvious and will in part be pointed out hereinafter in the specification by reference to the accompanying drawing forming a part thereof.

Fig. 1 is an elevational face view of one of the coupling units.

Fig. 2 is a sectional view on line 2—2 of Fig. 1.

Fig. 3 illustrates the coupling members inter-engaged to transmit power.

Fig. 4 is a sectional view through the mid portion of the coupling members illustrated in Fig. 3, and shows the coupling associated with a motor.

Fig. 5 is a diagrammatic view illustrating the operation of the coupling members where the axes of the driving and driven shafts are slightly out of alignment.

Referring now to the drawing, the coupling member comprises a head 1 provided with a slot 2 and a pin 4. The axes of the pin 4 and the slot 2 are on the same diameter of the head 4 in order to permit free movement between the parts when two coupling members are engaged, as will later be pointed out. The pin 4 carries a bushing 5 which preferably is of fiber or other suitable bushing material, adapted to absorb shocks and prevent noise. The end of the pin 4 may be slightly upset or expanded, if desired, to hold the bushing 5 in place thereon. The head 1 may be attached as by a key 6 to a suitable shaft 7.

Referring to Figs. 3 and 4, one coupling head is mounted upon the driving shaft 7 and the other coupling head is mounted upon a driven shaft 8. The bushing 5 on one head extends through slot 2 on the other head so that rotary motion from the driving shaft 7 is transmitted to the driven shaft 8. The bottom of the slot 2 is nearer to the axis of the head 1 than is the inner portion of the bushing 5, so that a slight radial sliding motion may occur between the bushing 5 and the slot 2 of the adjacent coupling member if the axes of the coupling members are not in alignment. Where the shafts are slightly angularly disposed, there is a slight reciprocating movement between the bushings and their respective corresponding slots in the cooperating coupling member. These coupling members, therefore, provide a flexible coupling which operates without transmitting axial vibrations and wherein accurate alignment of the rotating members is not essential. This feature is of great practical importance in the rapid assembly of units. It may also be observed by referring to Fig. 4 that when the coupling member on the driving shaft 7 is rotated and stopped with the bushing 5 thereof directly over the driven shaft 8 that the motor 9 may be lifted from its support 10 by merely removing the base nuts 11, since the coupling members separate when the motor is lifted in the direction of the arrow A.

Referring to the diagrammatic Fig. 5, the coupling member shown in full lines rotates about the axis 12 while the coupling member indicated in dotted lines rotates about the axis 14. The center of the pin on the full line member rotates on the orbit 15 while the pin of the doted line rotates on the orbit 16. By slight relative movement between the bushings 5 and their respective engaging slots 2, it will be observed that rotary motion is transmitted between the coupling members even when the axes thereof are offset. This is further facilitated by the fact that the slots 2 are slightly wider than the diameter of the bushings 5 so that at no point in the orbits of the pins is there any tendency of the bushings to bind in the slots with which they are engaged.

The extreme simplicity of the coupling comprising the present invention makes the same economical to manufacture and economical to assemble, and the construction of the coupling is such as to permit close coupling of driving and driven units as well as to facilitate removal of either of the units with a minimum amount of effort.

Having described my invention, I claim:—

1. An article of manufacture comprising a coupling member having a head adapted to be mounted upon a shaft, said head being provided on one side with an open slot extending radially of said head relative to the axis on which said shaft is adapted to be mounted, a projection on said head and extending parallel to said shaft and diametrically opposed to said open slot, said projection and said slot being adapted to cooperate with the slot and a projection of an identical coupling member to transmit power through said projection and slot connection.

2. A coupling comprising a pair of identical members mounted face to face, each member being mounted on a shaft and having an opening with parallel side walls, the axis of said opening extending radially from the axis of said shaft, a pin extending outwardly from the face of each member, resilient bushings on each of said pins, means to hold said bushings in place on said pins, said bushings being of slightly less diameter than the width of said radial openings to allow a freedom of movement of said parts, the bottom wall of each opening being nearer the axis of its respective shaft than the innermost portion of the bushing carried by the same member whereby the axes of said shafts may be slightly offset and said bushings may have a slight reciprocatory movement in the openings of the corresponding members when the shafts are rotating.

REHL W. SWANK.